US012200313B2

(12) United States Patent
    Kalam

(10) Patent No.: US 12,200,313 B2
(45) Date of Patent: *Jan. 14, 2025

(54) SYSTEM AND METHOD FOR GENERATING AN ENHANCED CONTENT-RECEIVER SIGNAL

(71) Applicant: DISH Network Technologies India Private Limited, Bangalore (IN)

(72) Inventor: Arun Pulasseri Kalam, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,460

(22) Filed: Oct. 24, 2023

(65) Prior Publication Data

US 2024/0056650 A1   Feb. 15, 2024

Related U.S. Application Data

(63) Continuation of application No. 17/841,453, filed on Jun. 15, 2022, now Pat. No. 11,849,195.

(51) Int. Cl.
| | |
|---|---|
| *H04N 21/61* | (2011.01) |
| *H01Q 1/24* | (2006.01) |
| *H04N 21/426* | (2011.01) |
| *H04N 21/45* | (2011.01) |
| *H01Q 19/12* | (2006.01) |

(52) U.S. Cl.
CPC ......... *H04N 21/6143* (2013.01); *H01Q 1/247* (2013.01); *H04N 21/42607* (2013.01); *H04N 21/4524* (2013.01); *H01Q 19/12* (2013.01)

(58) Field of Classification Search
CPC ............ H04N 21/6143; H04N 21/247; H04N 21/42607; H04N 21/4524
See application file for complete search history.

(56) References Cited

U.S. PATENT DOCUMENTS

| | | | | |
|---|---|---|---|---|
| 9,473,802 | B2* | 10/2016 | Naik Raikar | .... H04N 21/23439 |
| 2002/0045459 | A1* | 4/2002 | Morikawa | ......... H04W 72/0453 |
| | | | | 455/524 |
| 2009/0068941 | A1* | 3/2009 | Barroso | ........... H04N 21/44209 |
| | | | | 375/316 |
| 2013/0219435 | A1* | 8/2013 | Pattison | ................... H04N 7/20 |
| | | | | 348/731 |

(Continued)

*Primary Examiner* — Mulugeta Mengesha
(74) *Attorney, Agent, or Firm* — Seed IP Law Group LLP

(57) ABSTRACT

Methods and apparatuses for improving satellite broadcasting services by enhancing set-top box (STB) signal reception during weather conditions that obstruct the transmission of RF signals from one or more satellites to a receiving antenna (e.g., a dish antenna) are described. To prevent loss of satellite broadcasting services, an enhanced STB signal system may be arranged between the receiving antenna and an STB in order to provide an enhanced signal to the STB in the event that the RF signals received by the receiving antenna are not able to be decoded. The enhanced STB signal system may transmit an enhanced signal to the STB instead of a signal that was only derived from the receiving antenna. The enhanced signal may comprise a combination of signals that derive from other receiving antennas different from the receiving antenna, as well as the signal derived from the receiving antenna.

20 Claims, 9 Drawing Sheets

(56) References Cited

U.S. PATENT DOCUMENTS

2014/0189756 A1* 7/2014 Beals .................. H04N 21/631
 725/68
2016/0191913 A1* 6/2016 Martch ............ H04N 21/25841
 348/189

* cited by examiner

SYSTEM AND METHOD FOR GENERATING AN ENHANCED CONTENT-RECEIVER SIGNAL

BACKGROUND

The direct broadcast satellite (DBS) system uses communications satellites located in geostationary orbit to broadcast high-powered radio frequency (RF) signals to relatively small outdoor parabolic antennas or dish antennas. A low-noise block down-converter may be mounted to a dish antenna for receiving the RF signals collected by the dish antenna and amplifying them prior to down-conversion to lower frequencies. One advantage of receiving the RF signals using a dish antenna is that it has high directivity. However, receiving an RF signal at the dish antenna that has sufficient signal strength to be successfully decoded typically requires a clear line of sight with few obstructions between a transmitting satellite and the dish antenna. Unfortunately, in some places, undesirable weather conditions such as heavy cloud cover, fog, rain, and snow may obstruct the transmission of the RF signals and substantially weaken the signal strength of the RF signals received at the dish antenna causing interruptions in satellite broadcasting services.

BRIEF SUMMARY

Systems and methods for improving satellite broadcasting services via enhancements to set-top box signal reception during adverse weather conditions are provided. To prevent interruptions to satellite broadcasting services, an enhanced set-top box signal system may be arranged between a receiving antenna and a set-top box to provide an enhanced signal to the set-top box in the event that RF signals received by the receiving antenna are not able to be decoded or have a poor signal-to-noise ratio. The enhanced signal may comprise a combination of signals (e.g., a weighted combination of signals) that derive from other receiving antennas different from the receiving antenna. The enhanced set-top box signal system may utilize the enhanced signal to prevent interruptions from occurring to satellite broadcasting services.

According to some embodiments, the technical benefits of the systems and methods disclosed herein for improving satellite broadcasting services include reduced downtime for satellite broadcasting services, improved satellite Internet streaming performance, and reduced energy consumption for providing satellite broadcasting services, such as satellite television services and satellite Internet services.

BRIEF DESCRIPTION OF THE SEVERAL VIEWS OF THE DRAWINGS

Like-numbered elements may refer to common components in the different figures.

DETAILED DESCRIPTION

Figure 1A:
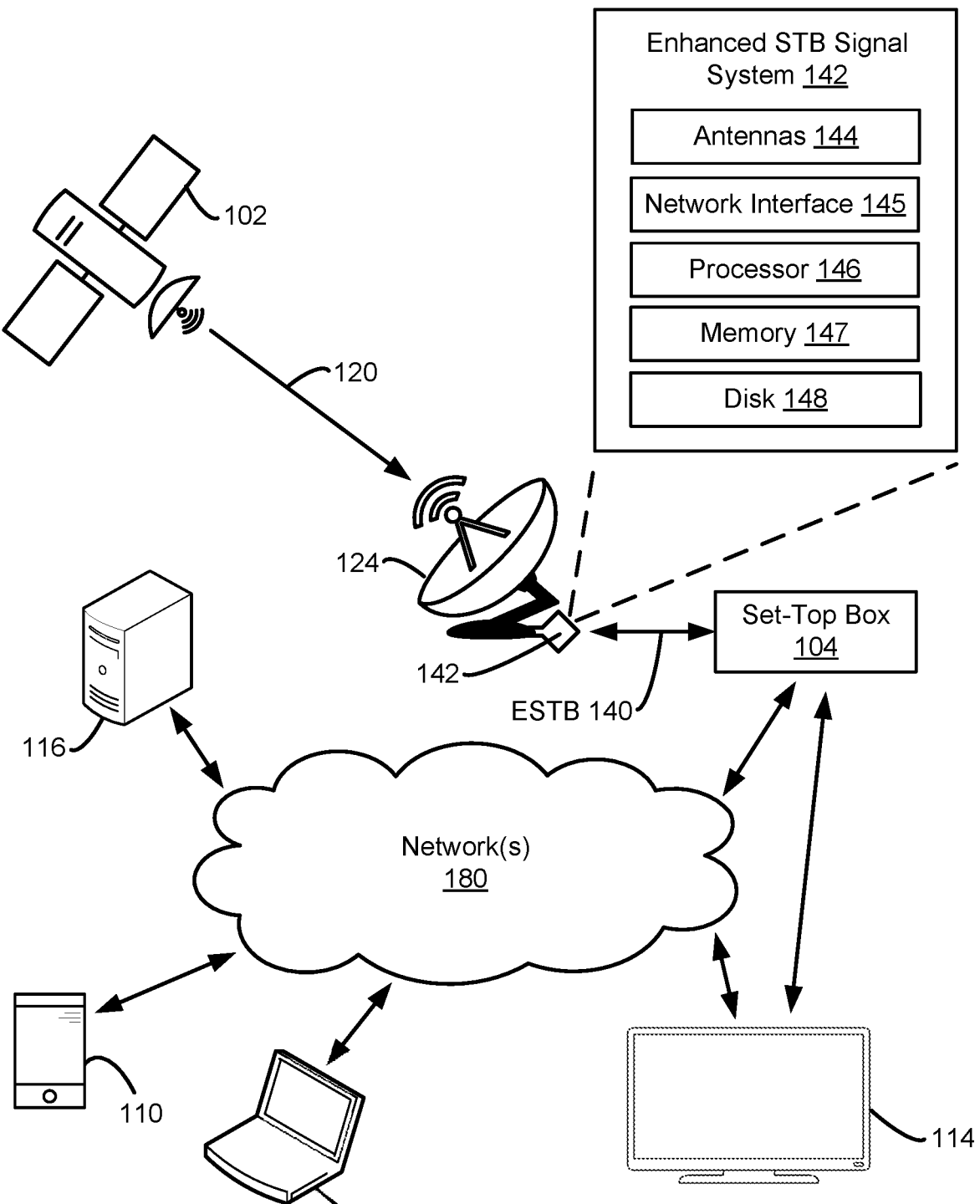
FIG. 1A depicts one embodiment of a networked computing environment.

Technology described herein improves satellite broadcasting services by enhancing set-top box signal reception during weather conditions that obstruct the transmission of RF signals from one or more satellites to a receiving antenna (e.g., a dish antenna). The receiving antenna may be paired with circuitry (e.g., a low-noise block down-converter) for amplifying a signal (e.g., a microwave signal) that was received from the one or more satellites, converting the signal to a lower frequency band, and transmitting the down-converted signal to a set-top box (STB) or satellite receiver (e.g., via a coaxial cable or network connection). In some cases, an STB may include a receiver front end for receiving the down-converted signal and demodulating the down-converted signal and an STB decoder for decoding the demodulated signal and transmitting a decoded signal to a display device (e.g., a television) so that content encoded within the demodulated signal may be displayed using the display device. An STB may comprise a computing device that allows a digital signal to be received, decoded, and displayed using a display device.

A technical issue with using a dish antenna to capture RF signals transmitted by one or more satellites is that the RF signals may be obstructed or attenuated due to absorption and scattering caused by the presence of rain, snow, or ice in the atmosphere. The RF signals received by a dish antenna acting as a receiving antenna may also be obstructed or attenuated due to the accumulation of snow or ice on a surface of the dish antenna or due to a physical misalignment of the dish antenna with one or more satellites transmitting a satellite broadcasting service. In these situations, the satellite broadcasting service (e.g., a satellite TV service or a satellite Internet service) received by the receiving antenna may be interrupted or experience a significant degradation in service. To prevent significant degradations in service from occurring to the satellite broadcasting service, an enhanced STB signal system may be arranged between the receiving antenna and the STB in order to provide an enhanced signal to the STB in the event that the RF signals received by the receiving antenna are not able to be decoded or are otherwise unable to provide the transmitted satellite broadcasting service. A technical benefit of utilizing the enhanced STB signal system is that interruptions to satellite broadcasting services may be prevented.

In some embodiments, the enhanced STB signal system may transmit an enhanced STB signal to the STB or replace the weak signal derived from the receiving antenna with the enhanced STB signal upon detection that a decoding failure has occurred for data encoded within the signal derived from the receiving antenna, that the signal strength of the signal derived from the receiving antenna is less than a threshold signal strength (e.g., is less than −60 dBm), or that the signal-to-noise ratio (SNR) of the signal derived from the receiving antenna is less than an SNR threshold (e.g., is less than 8 dB). The ability for the STB to demodulate and decode a received signal may be highly dependent on the SNR of the received signal as amplification of the received signal will also amplify the embedded noise within the received signal.

In at least one embodiment, upon detection that an STB has experienced a decoding failure, an enhanced STB signal system may transmit an enhanced signal to the STB instead of a signal that was derived from a receiving antenna. The enhanced signal may comprise a combination of signals that derive from other receiving antennas different from the receiving antenna, as well as the signal derived from the receiving antenna. A technical benefit of combining signals from a plurality of antennas is that although each antenna of the plurality of antennas may be receiving weak RF signals, a combination of the weak RF signals may allow content encoded within the RF signals to be decoded and properly displayed using a display device. In one example, upon detection that the STB has experienced a decoding failure, the enhanced STB signal system may transmit an enhanced signal to the STB that derives from both the receiving antenna and nine other receiving antennas. In another example, upon detection that the STB has experienced a decoding failure, the enhanced STB signal system may transmit an enhanced signal to the STB that only derives from the nine other receiving antennas.

In some cases, each receiving antenna may be paired with an enhanced STB signal system that includes a 60 GHz transmitter antenna and a 60 GHz receiver antenna pair to allow for wireless communication with other enhanced STB signal systems associated with other receiving antennas using the 60 GHz spectrum (e.g., using 60 GHz WiFi via the IEEE 802.11ad standard or the IEEE 802.11ay standard). The auxiliary 60 GHz transmitter and 60 GHz receiver pair may allow for each enhanced STB signal system to communicate with other enhanced STB signal systems within a particular distance (e.g., within a one mile radius). Each enhanced STB signal system that is paired with a receiving antenna (e.g., a first dish antenna capturing RF signals from one or more satellites) may process signals deriving from the receiving antenna as well as signals deriving from one or more other receiving antennas (e.g., a second dish antenna capturing RF signals from the one or more satellites). In one example, a first enhanced STB signal system may combine a first signal received from its paired receiving antenna and a second signal received from a second receiving antenna. The second signal may be transmitted to the first enhanced STB signal system using the 60 GHz transmitting antenna of a second enhanced STB signal system paired with the second receiving antenna. The second signal may be received by the first enhanced STB signal system using its 60 GHz receiving antenna. Subsequently, the first enhanced STB signal system may transmit the combined signal to a third enhanced STB signal system using its 60 GHz transmitting antenna and the third enhanced STB signal system may combine the received combined signal with a third signal received from a third receiving antenna paired with the third enhanced STB signal system.

There are several techniques for combining signals from different enhanced STB signal systems including diversity combining techniques such as equal-gain combining (e.g., where the received signals are summed coherently), maximal-ratio combining (e.g., where the received signals are weighted with respect to their SNR and then summed), switched combining, and selection combining (e.g., where out of multiple received signals, the signal with the strongest signal or the highest SNR is selected). The diversity combining techniques allow two or more signals each carrying the same message or information to improve the SNR of each of the two or more signals.

A technical benefit of pairing enhanced STB signal systems with existing dish antennas and not updating or replacing existing STBs is that replacing STBs is expensive and connecting the enhanced STB signal systems to existing dish antennas provides greater flexibility with different implementations. For example, enhanced STB signal systems in a city environment may utilize auxiliary receivers and transmitters with a first maximum range (e.g., a range of at most 0.5 miles) due to the number of other enhanced STB signal systems within a close proximity, while enhanced STB signal systems in a rural environment may utilize auxiliary receivers and transmitters with a second maximum range greater than the first maximum range (e.g., a range of up to five miles).

A technical benefit of allowing an enhanced STB signal system to detect and communicate with a number of other enhanced STB signal systems within a range of its auxiliary receivers and transmitters is that the enhanced STB signal system may periodically acquire signal strength information and SNR information from each of the other enhanced STB signal systems within the range of its auxiliary receivers and transmitters. The enhanced STB signal system may then select a subset of the other enhanced STB signal systems to generate and transmit an enhanced signal to the enhanced STB signal system in order to prevent the loss of satellite broadcasting services during weather conditions that obstruct the transmission of RF signals from one or more satellites. In some cases, the subset of the other enhanced STB signal systems for generating the enhanced signal may comprise enhanced STB signal systems that are at least a threshold distance away (e.g., at least ten miles away); in this case, if a loss of service was caused by a localized weather event, then the likelihood of the other enhanced STB signal systems being impacted by the same localized weather event may be significantly reduced.

FIG. 1A depicts one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile smartphone 110, laptop computing device 112, network-connected digital television 114, hardware server 116, set-top box (STB) 104, and enhanced STB signal system 142. The enhanced STB signal system 142 is in communication with the dish antenna 124 and transmits an enhanced signal ESTB 140 to the STB 104. A satellite 102 may transmit an RF signal 120 to the dish antenna 124. The RF signal 120 may transmit satellite broadcasting services to the dish antenna 124, which may be displayed using the digital television 114 via decoded signals provided to the digital television 114 by the STB 104. The STB 104 may connect to or communicate with the digital television 114 via the one or more networks 180 or via a dedicated coaxial cable connection.

In some embodiments, the plurality of computing devices may include other computing devices not shown. In some embodiments, the plurality of computing devices may include more than or less than the number of computing devices depicted in FIG. 1A. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks. Each network of the one or more networks 180 may include hubs, bridges, routers, switches, and wired transmission media such as a wired network or direct-wired connection.

In some embodiments, computing devices within the networked computing environment 100 may comprise real hardware computing devices or virtual computing devices, such as one or more virtual machines. Networked storage devices within the networked computing environment 100 may comprise real hardware storage devices or virtual storage devices, such as one or more virtual disks. The real hardware storage devices may include non-volatile and volatile storage devices.

Networked computing environment 100 may provide a cloud computing environment for one or more computing devices. Cloud computing may refer to Internet-based computing, wherein shared resources, software, and/or information are provided to the one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The enhanced STB signal system 142 may be arranged between the dish antenna 124 and the STB 104 in order to generate and transmit the enhanced signal ESTB 140 to the STB 104 in the event that the RF signal 120 received by the dish antenna 124 is not able to be decoded. The enhanced signal ESTB 140 transmitted to the STB 104 (e.g., via a wireless network interface, a wired network interface, or a coaxial cable) may comprise a combination of signals that derive from other dish antennas not depicted different from the dish antenna 124. One embodiment of the enhanced STB signal system 142 includes antennas 144, a network interface 145, processor 146, memory 147, and disk 148 all in communication with each other. Network interface 145 allows the enhanced STB signal system 142 to connect to one or more networks 180 and/or to connect to the STB 104. The enhanced STB signal system 142 may electrically connect to the STB 104 via a coaxial cable and/or transmit the enhanced signal ESTB 140 to the STB 104 using a coaxial cable. Network interface 145 may include a wireless network interface and/or a wired network interface. Processor 146 allows the enhanced STB signal system 142 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, or Flash). Memory 147 may comprise a hardware storage device or a semiconductor memory.

The antennas 144 may comprise an auxiliary transmitter antenna and an auxiliary receiver antenna for communicating with other enhanced STB signal systems within a range of the auxiliary transmitter antenna and the auxiliary receiver antenna. In at least one example, the antennas 144 may comprise a 60 GHz transmitter antenna and a 60 GHz receiver antenna pair to allow for wireless communication with other enhanced STB signal systems.

In some cases, the server 116 may comprise a server within a data center. The data center may include one or more servers, such as server 116, in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

In some embodiments, the server 116 may acquire digital signals that derive from a plurality of dish antennas including dish antenna 124, generate a combined signal using the digital signals, and then transmit the combined signal to an enhanced STB signal system, such as the enhanced STB signal system 142 so that the enhanced STB signal system 142 may selectively transmit the combined signal to the STB 104.

Figure 1B:
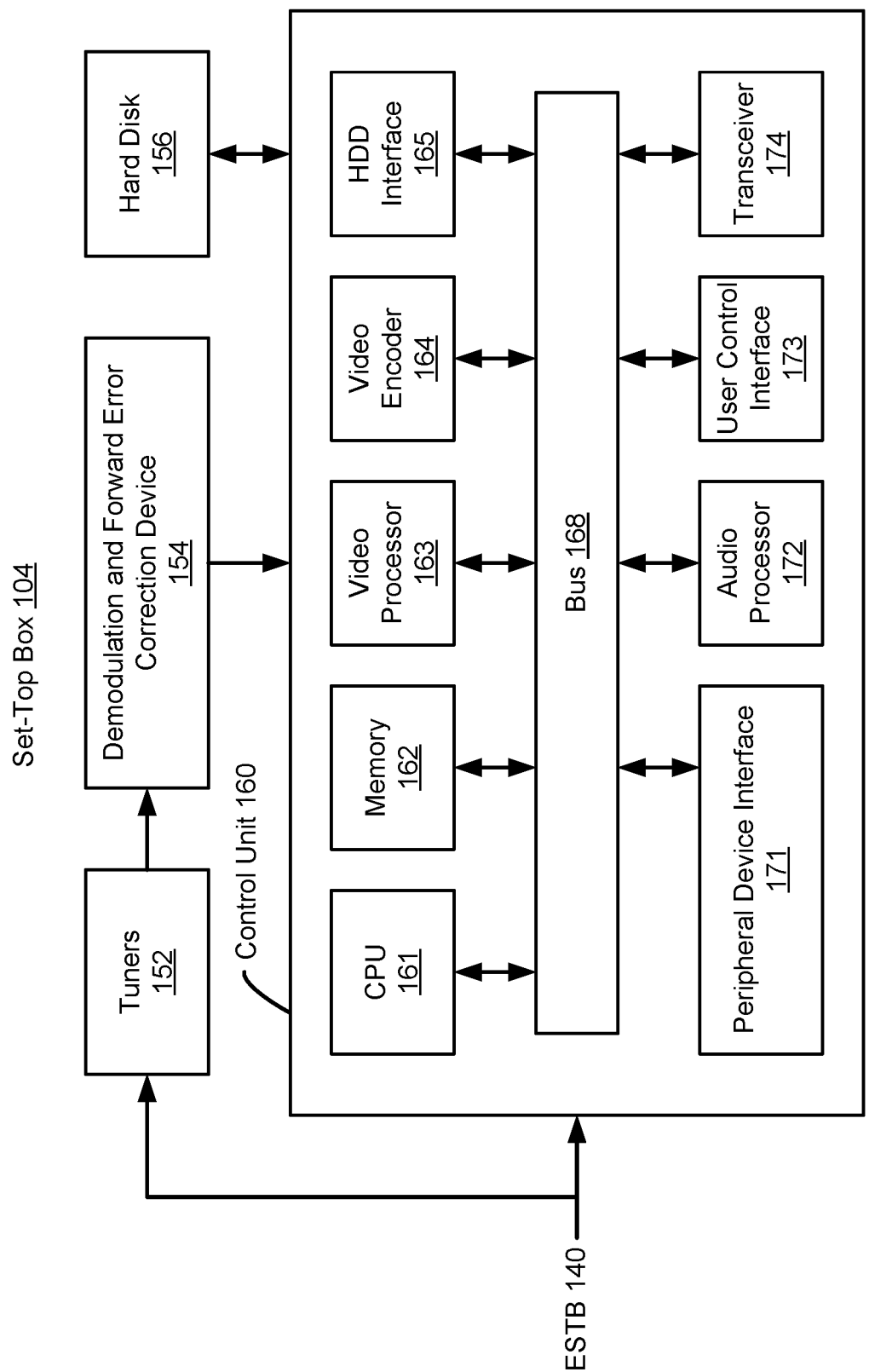
FIG. 1B depicts an embodiment of a set-top box.

FIG. 1B depicts an embodiment of the set-top box (STB) 104 in FIG. 1A. The enhanced signal ESTB 140 that is input to the STB 104 in FIG. 1A may be processed or decoded by the STB 104 and a decoded signal may be output from the STB 104 to a display device, such as an analog or digital television. The STB 104 may include one or more tuner devices 152 that receive commands from control unit 160. Such commands may cause each of the one or more tuners 152 to tune to a particular frequency band corresponding with a television channel that an end user of a display device would like to view. Signals output from the one or more tuners 152 are provided to a demodulation and forward error correction device 154. The demodulation and forward error correction device 154 may demodulate the enhanced signal ESTB 140 by extracting an information bearing signal associated with content (e.g., audiovisual content) from the enhanced signal ESTB 140. The demodulation and forward error correction device 154 may comprise an electronic circuit for extracting or recovering content from a modulated carrier wave or signal. The demodulation and forward error correction device 154 may also apply error detection and correction techniques to fix data transmission errors. Data signals output from the demodulation and forward error correction device 154 are provided to the control unit 160.

Various components of the control unit 160 may be included in one or more integrated circuits. The control unit 160 may operate under the control of a software program, firmware program, or some other program stored in memory or control logic. The control unit 160 may include fewer, more, or different components from those shown in FIG. 1B and described below.

The control unit 160 includes a shared bus 168 that communicatively couples at least one central processing unit (CPU) 161 and a memory 162. The memory 162 may comprise a volatile or non-volatile memory. The memory 162 may store control programs that are executed by the CPU 161. The control unit 160 may include at least one video processor 163 that decodes and processes an encoded signal. The video processor 163 may include a graphics processor and/or an MPEG-2 decoder. The control unit 160 may also include a video encoder 164 that may work in combination with the video processor 163 to encode signals that are output to one or more peripheral devices, such as an analog or digital television, via the peripheral device interface 171. The control unit 160 may also include at least one hard disk drive interface 165 and a hard disk drive 156. The hard disk drive interface 165 may provide an IDE/EIDE interface for transferring information to and from the hard disk drive 156. The hard disk drive 156 may store recorded programs, buffered data from a program being viewed, EPG data, an operating system, control programs, timers, or other data.

In addition, the control unit 160 may include an audio processor 172, which may decode a digital stream for output to one or more peripheral audio devices, such as a stereo amplifier or a digital television, via the peripheral device interface 171. The control unit 160 also includes a transceiver 174 that is configured to transmit and receive data. In one or more embodiments, the transceiver 174 includes at least one antenna that is configured to transmit and receive wireless signals in a particular RF band, such as a 2.4 gigahertz ultra high frequency (UHF) band. The transceiver 174 may be configured to transmit and/or receive RF signals via the at least one antenna. The control unit 160 may also include a user control interface 173. The user control interface 173 may receive signals from buttons and/or a keypad connected to the STB 104. In one example, an end user may operate the keypad to power the STB 104 on and off, and to change the channel of the programming content that is being output from the STB 104 via the peripheral device interface 171.

Figure 2A:
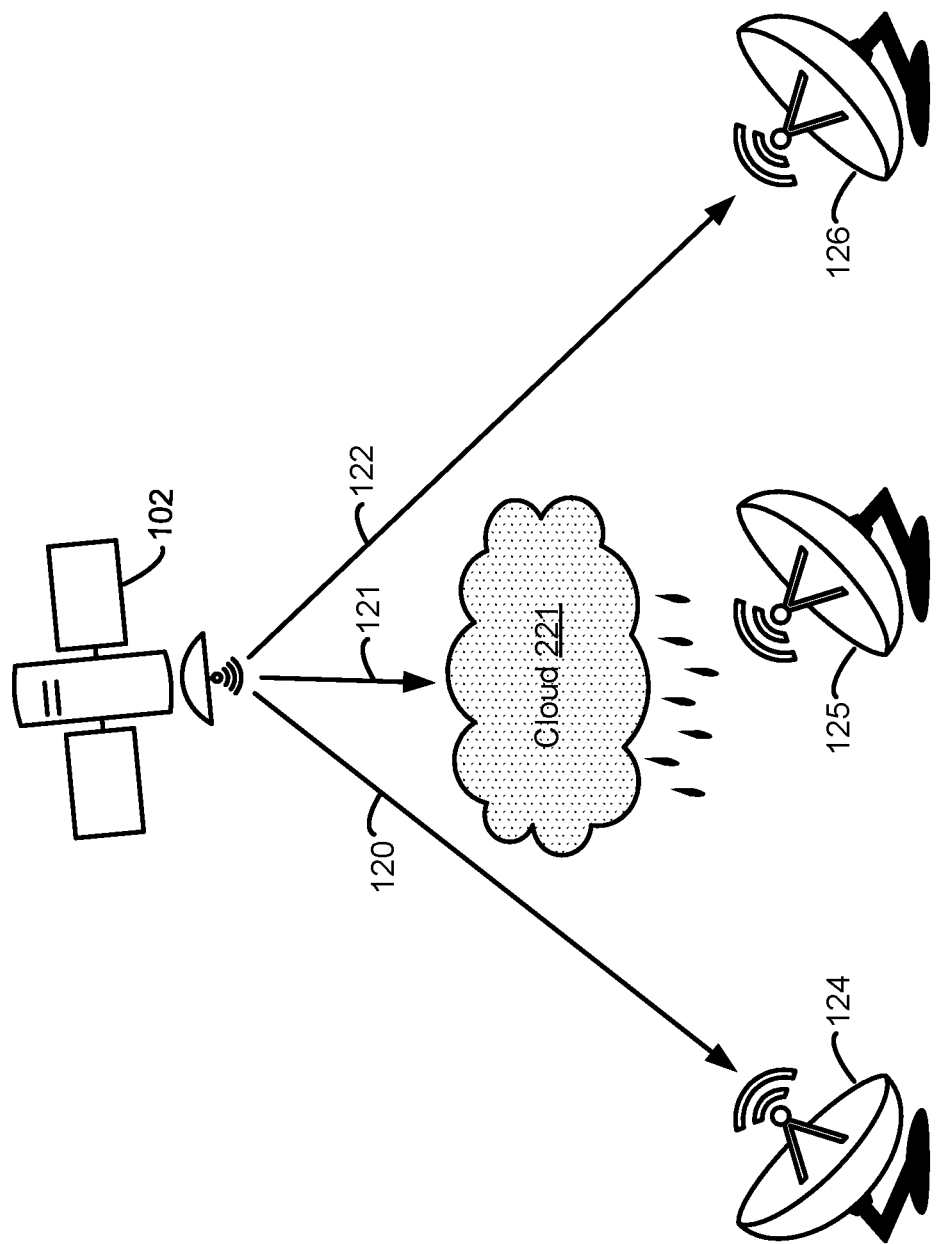
FIGS. 2A-2C depict various embodiments of dish antennas capturing RF signals from a satellite.

FIG. 2A depicts an embodiment of three dish antennas 124-126 and a satellite 102. The three dish antennas 124-126 may comprise receiving antennas for capturing RF signals broadcasted from the satellite 102. As depicted, the satellite 102 has transmitted the RF signal 120, which has been captured by the dish antenna 124. The RF signal 120 may transmit satellite broadcasting services to the dish antenna 124. The satellite 102 has also transmitted the RF signal 122, which is been captured by the dish antenna 126, and transmitted the RF signal 121 which has been obstructed by the cloud 221 and has prevented an unobstructed or unaltered RF signal from being captured by the dish antenna 125. The RF signals 120-122 may be broadcasted by the satellite 102 to provide satellite broadcasting services, such as satellite television services or satellite Internet services. The cloud 221 may contain a significant amount of liquid water droplets, rain, snow, and/or ice that temporarily obstructs (e.g., for ten minutes) a line of sight between the satellite 102 and the dish antenna 125.

Figure 2B:
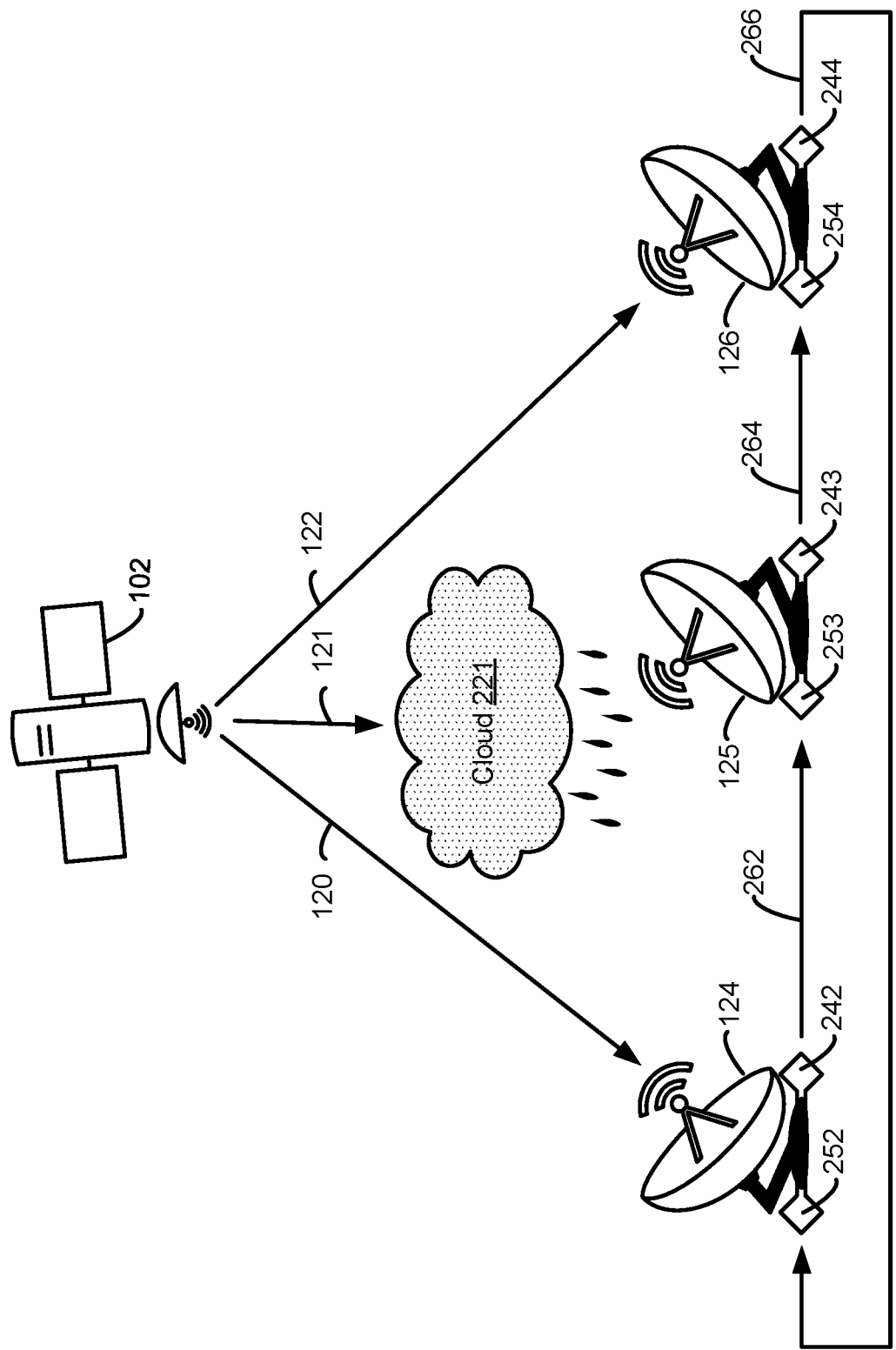

FIG. 2B depicts another embodiment of three dish antennas 124-126 and a satellite 102 that has transmitted RF signals 120-122 to provide satellite broadcasting services. The dish antenna 124 includes or is in communication with circuitry for receiving RF signals, an auxiliary transmitter 242, and an auxiliary receiver 252. The auxiliary transmitter 242 may comprise a 60 GHz transmitter and the auxiliary receiver 252 may comprise a 60 GHz receiver. In some cases, the circuitry for receiving RF signals, the auxiliary transmitter 242, and the auxiliary receiver 252 may comprise components of an enhanced STB signal system, such as the enhanced STB signal system 142 in FIG. 1A. The auxiliary transmitter 242 and the auxiliary receiver 252 may correspond with antennas 144 in FIG. 1A. The auxiliary transmitter 242 may transmit a first signal 262 derived from RF signals received at the dish antenna 124 to an auxiliary receiver 253 associated with the dish antenna 125.

The dish antenna 125 includes or is in communication with circuitry for receiving RF signals, an auxiliary transmitter 243, and an auxiliary receiver 253. The auxiliary transmitter 243 may transmit a second signal 264 derived from RF signals received at the dish antenna 125 and/or the first signal 262 to an auxiliary receiver 254 associated with the dish antenna 126. The dish antenna 126 includes or is in communication with circuitry for receiving RF signals, an auxiliary transmitter 244, and an auxiliary receiver 254. The auxiliary transmitter 244 may transmit a third signal 266 derived from RF signals received at the dish antenna 126 and/or the second signal 264 to the auxiliary receiver 252 associated with the dish antenna 124.

In some embodiments, the first signal 262 may comprise a signal that derives from RF signals captured by the dish antenna 124. The first signal 262 may comprise a filtered, amplified, and down-converted signal that derives from the RF signals captured by the dish antenna 124. The second signal 264 may comprise a combination of the first signal 262 and a signal that derives from RF signals captured by the dish antenna 125. In at least one example, a diversity combining technique such as equal-gain combining or maximal-ratio combining may be applied to generate the second signal 264. The second signal 264 may be generated using circuitry within an enhanced STB signal system, such as the enhanced STB signal system 142 in FIG. 1A, to perform coherent addition of the first signal 262 to the signal that derives from RF signals captured by the dish antenna 125. The circuitry within the enhanced STB signal system may also weigh inputted signals by their SNRs and combine the inputted signals according to their SNRs.

The third signal 266 may comprise a combination of the second signal 264 and a signal that derives from RF signals captured by the dish antenna 126. In at least one example, a diversity combining technique such as equal-gain combining or maximal-ratio combining may be applied to generate the third signal 266 using the second signal 264 and the signal that derives from RF signals captured by the dish antenna 126. The third signal 266 may be generated using circuitry within an enhanced STB signal system, such as the enhanced STB signal system 142 in FIG. 1A, associated with the dish antenna 126 to perform summation or coherent addition of the second signal 264 to the signal that derives from RF signals captured by the dish antenna 126. Therefore, the first signal 262 may include information extracted from the RF signals captured by the dish antenna 124, the second signal 264 may include information extracted from the RF signals captured by both the dish antenna 124 and the dish antenna 125, and the third signal 266 may include information extracted from the RF signals captured by the dish antenna 124, the dish antenna 125, and the dish antenna 126. The third signal 266 may comprise a signal that includes information extracted from each dish antenna within a set of dish antennas that are connected together in a daisy chain configuration or in a series configuration.

Figure 2C:
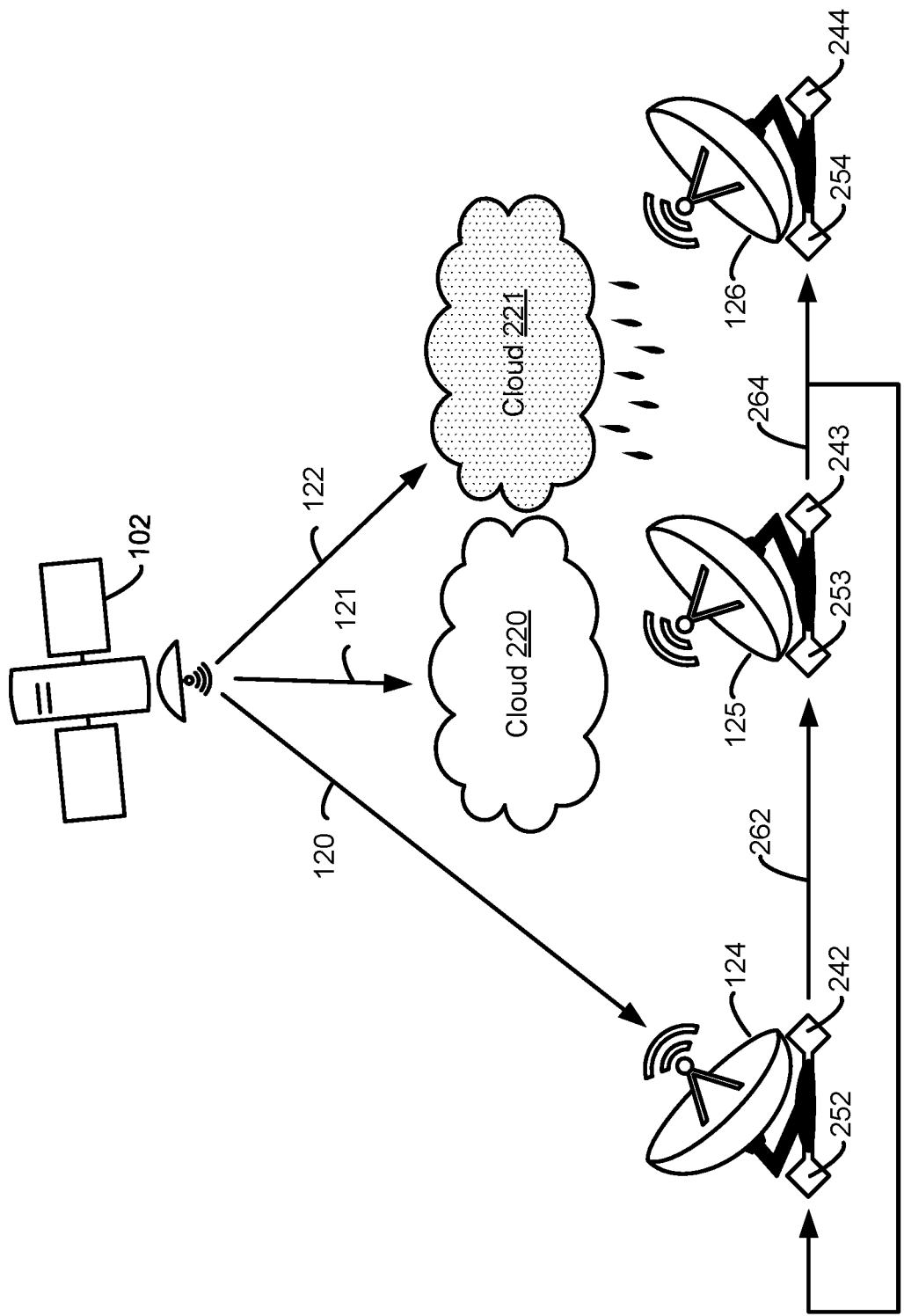

FIG. 2C depicts an embodiment of the three dish antennas 124-126 in FIG. 2B, in which the cloud 221 has moved to obstruct a line of sight between the satellite 102 and the dish antenna 126 and a cloud 220 has moved to partially obstruct a line of sight between the satellite 102 and the dish antenna 125. In this case, the dish antenna 125 may capture a significantly weakened version of the RF signal 121 that may include content that is still decodable or viewable. However, due to the cloud 221, the dish antenna 126 and circuitry for receiving and decoding signals captured by the dish antenna 126 may be unable to decode or identify content encoded within the RF signal 122. In response to detecting that the dish antenna 126 and/or circuitry for receiving signals captured by the dish antenna 126 is unable to decode or identify content encoded within the RF signal 122, an enhanced STB signal system associated with the dish antenna 125 may generate the second signal 264 by combining RF signals received at the dish antenna 125 with the first signal 262 and transmit the second signal 264 to the auxiliary receiver 254 associated with the dish antenna 126. In some cases, RF signals received from a set of dish antennas may be combined and transmitted to a dish antenna, such as the dish antenna 126, that is unable to decode or identify content by itself or without additional information received from the set of dish antennas.

Figure 2D:
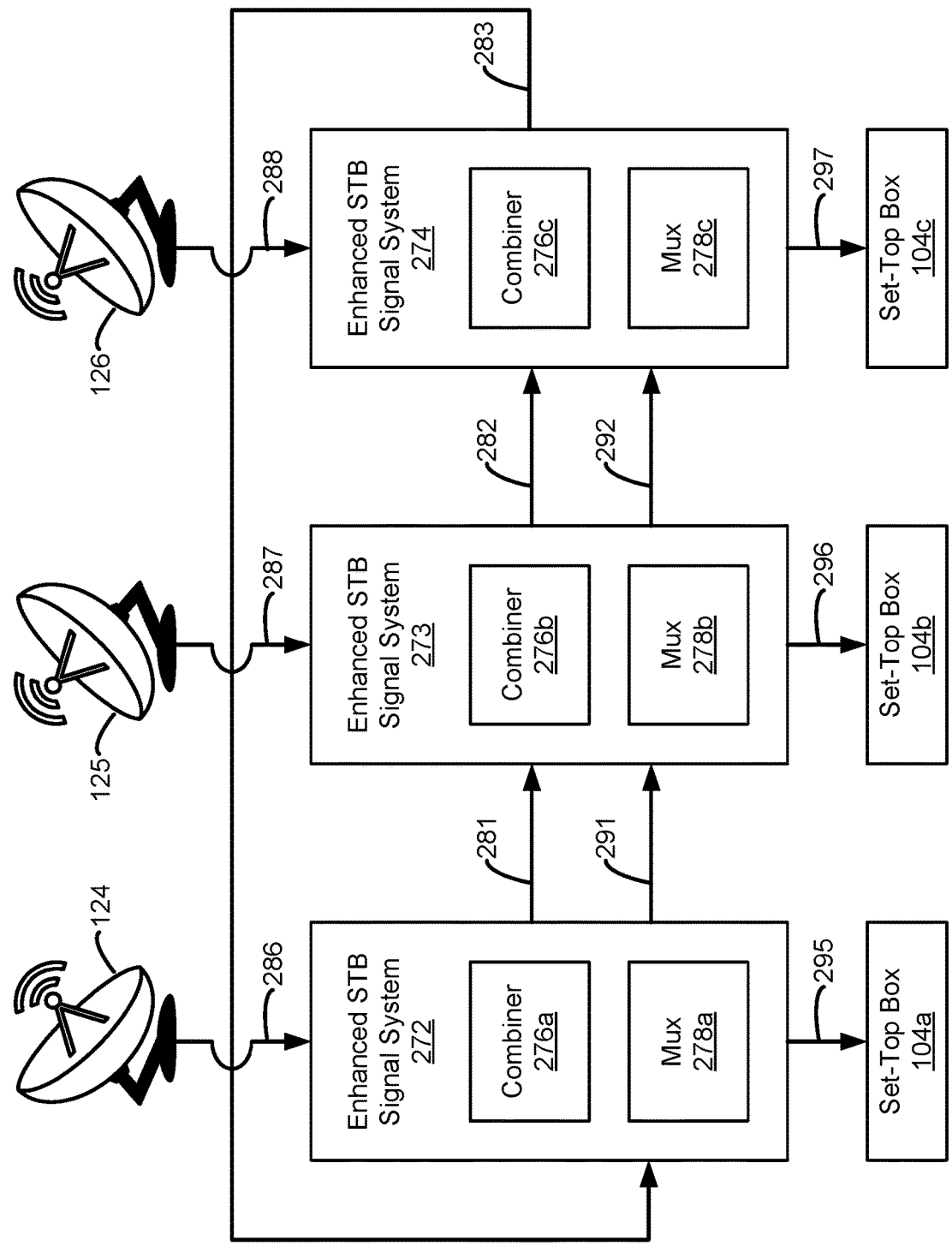
FIG. 2D depicts an embodiment of dish antennas in communication with enhanced set-top box signal systems.

FIG. 2D depicts an embodiment of the three dish antennas 124-126 in communication with enhanced STB signal systems 272-274. Each of the enhanced STB signal systems 272-274 includes a signal combiner 276, such as one of the signal combiners 276a-276c, and an analog multiplexor 278, such as one of the analog multiplexors 278a-278c. In one example, the enhanced STB signal system 272 may correspond with the enhanced STB signal system 142 in FIG. 1A. The enhanced STB signal system 272 includes a signal combiner 276a and an analog multiplexor 278a. The signal combiner 276a may combine two or more signals received by the enhanced STB signal system 272 using one or more signal combining techniques, such as diversity combining techniques. The one or more signal combining techniques may include equal-gain combining (e.g., where inputted signals are summed coherently), maximal-ratio combining (e.g., where inputted signals are weighted with respect to their SNRs and then a weighted combination of the inputted signals is generated), and selection combining (e.g., where out of two or more inputted signals, the inputted signal with the strongest signal or the highest SNR is selected). The diversity combining techniques may allow two or more signals each carrying the same message or information to improve the overall SNR of the combined signal.

The enhanced STB signal system 272 may comprise the first enhanced STB signal system in a sequence of enhanced STB signal systems that includes the enhanced STB signal system 273 and the enhanced STB signal system 274. The enhanced STB signal system 272 may take as input a signal 286 derived from the dish antenna 124. The signal 286 derived from the dish antenna 124 may comprise a filtered, amplified, and/or down-converted signal that was captured by the dish antenna 124 (e.g., generated by a low-noise block down-converter mounted to the dish antenna 124). As the first enhanced STB signal system in the sequence of enhanced STB signal systems, the signal combiner 276a may be bypassed or pass through the signal 286 derived from the dish antenna 124 to the output signal 281. The signal combiner 276b of the enhanced STB signal system 273 may take as inputs both a signal 287 derived from the dish antenna 125 and the output signal 281 from the enhanced STB signal system 272. The signal combiner 276b may combine the signal 287 derived from the dish antenna 125 and the output signal 281 using one or more signal combining techniques, such as equal-gain combining or maximal-ratio combining, and output the combined signal as the output signal 282.

The signal combiner 276c of the enhanced STB signal system 274 may take as inputs both a signal 288 derived from the dish antenna 126 and the output signal 282 from the enhanced STB signal system 273. The signal combiner 276c may combine the signal 288 derived from the dish antenna 126 and the output signal 282 using one or more signal combining techniques, such as equal-gain combining or maximal-ratio combining, and output the combined signal as the output signal 283. The enhanced STB signal systems 272-274 may transmit and receive the output signals 281-283 using auxiliary transmitter and receiver pairs, such as an auxiliary 60 GHz transmitter and 60 GHz receiver pair.

The output signal 283 generated by the enhanced STB signal system 274 may include signal information captured from all three dish antennas 124-126. The enhanced STB signal system 272 may receive the output signal 283 and use analog multiplexor 278a with output 295 to either pass the signal 286 derived from the dish antenna 124 to the STB 104a or the output signal 283 to the STB 104a. The enhanced STB signal system 272 may buffer and transit the output signal 283 as output signal 291. The enhanced STB signal system 273 may receive the output signal 291 and use analog multiplexor 278b with output 296 to either pass the signal 287 derived from the dish antenna 125 to the STB 104b or the output signal 291 to the STB 104b. The enhanced STB signal system 273 may buffer and transit the output signal 291 as output signal 292. Finally, the enhanced STB signal system 274 may receive the output signal 292 and use analog multiplexor 278c with output 297 to either pass the signal 288 derived from the dish antenna 126 to the STB 104c or the output signal 292 to the STB 104c. In some embodiments, the analog multiplexor 278c may pass the output signal 292 to the STB 104c if it is detected that the SNR of the signal 288 derived from the dish antenna 126 is less than a threshold SNR (e.g., is less than 8 dB) or that the signal strength of the signal 288 derived from the dish antenna 126 is less than a threshold signal strength (e.g., is less than −60 dBm).

In at least one embodiment, if at least one of the enhanced STB signal systems 272-274 experiences a decoding failure, then each of the enhanced STB signal systems 272-274 may pass a received combined signal to their respective STBs; for example, the analog multiplexor 278a may pass the output signal 283 to the STB 104a, the analog multiplexor 278b may pass the output signal 291 to the STB 104b, and the analog multiplexor 278c may pass the output signal 292 to the STB 104c.

Figure 3:
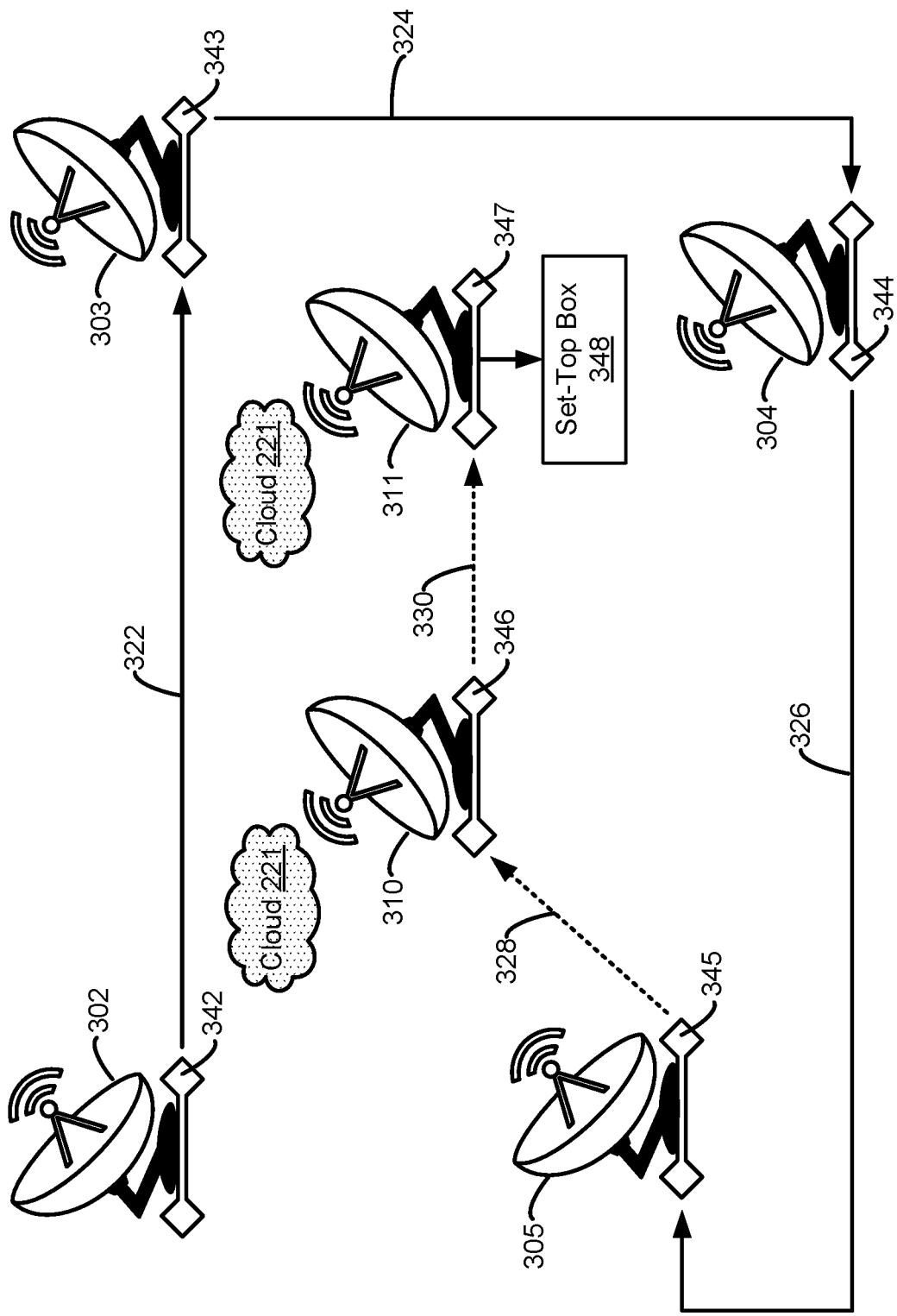
FIG. 3 depicts an embodiment of a first set of dish antennas and a second set of dish antennas.

FIG. 3 depicts an embodiment of a first set of dish antennas 302-305 and a second set of dish antennas 310 and 311. The first set of dish antennas 302-305 may correspond with a first set of enhanced STB signal systems 342-345 for combining signals derived from the first set of dish antennas 302-305. The second set of dish antennas 310 and 311 may comprise dish antennas that have obstructed line of sights due to weather or atmospheric conditions, such as clouds 221. The clouds 221 may prevent the second set of dish antennas 310, 311 from capturing RF signals transmitted from one or more satellites associated with a satellite broadcasting service.

In response to detecting that RF signals captured using the second set of dish antennas 310, 311 are unable to be decoded or are below a threshold SNR, the first set of enhanced STB signal systems 342-345 associated with the first set of dish antennas 302-305 may combine RF signals captured by the first set of dish antennas 302-305 using one or more combining techniques and transmit a combined signal to a second set of enhanced STB signal systems 346, 347 corresponding with the second set of dish antennas 310, 311. The first set of dish antennas 302-305 may comprise dish antennas that are positioned outside of a localized weather event, such as a snow or rain storm, and the second set of dish antennas 310, 311 may comprise dish antennas that are impacted by the localized weather event. The first set of enhanced STB signal systems 342-345 may acquire location information (e.g., GPS location information) for the second set of dish antennas 310, 311 and the first set of dish antennas 302-305. Processing elements (e.g., a processor such as the processor 146 in FIG. 1A) within the first set of enhanced STB signal systems 342-345 may determine a first sequence of dish antennas for generating a combined signal and a second sequence of dish antennas for transmitting the combined signal to the service impacted second set of dish antennas 310, 311.

As depicted in FIG. 3, upon detection that RF signals captured using one or more of the second set of dish antennas 310, 311 are unable to be decoded or are below a threshold SNR, the first set of enhanced STB signal systems 342-345 associated with the first set of dish antennas 302-305 may capture a first RF signal using the dish antenna 302 and transmit an output signal 322 that includes the first RF signal using an auxiliary transmitting antenna of the enhanced STB signal system 342. The enhanced STB signal system 343 may receive the output signal 322 via an auxiliary receiving antenna and generate a first combined signal that includes a second RF signal captured using the dish antenna 303 and the output signal 322. The enhanced STB signal system 343 may transmit an output signal 324 that includes the first combined signal using an auxiliary transmitting antenna of the enhanced STB signal system 343. The enhanced STB signal system 344 may receive the output signal 324 via an auxiliary receiving antenna and generate a second combined signal that includes a third RF signal captured using the dish antenna 304 and the output signal 324. The enhanced STB signal system 344 may transmit an output signal 326 that includes the second combined signal using an auxiliary transmitting antenna of the enhanced STB signal system 344. The enhanced STB signal system 345 may receive the output signal 326 via an auxiliary receiving antenna and generate a third combined signal that includes a fourth RF signal captured using the dish antenna 305 and the output signal 326. The enhanced STB signal system 345 may transmit an output signal 328 that includes the third combined signal using an auxiliary transmitting antenna of the enhanced STB signal system 345.

The enhanced STB signal systems 346, 347 may act as repeaters for transmitting the third combined signal to each of the second set of enhanced STB signal systems 346, 347 corresponding with the second set of dish antennas 310, 311. The enhanced STB signal systems 346 may buffer and transmit the output signal 328 that includes the third combined signal as the output signal 330. The output signal 330 may be generated and transmitted using a unity gain buffer. The enhanced STB signal system 347 may receive the output signal 330 and provide the output signal 330 to the STB 348, which may decode content for display using a display device connected to the STB 348.

In some embodiments, a first set of enhanced STB signal systems may be identified based on locations of a first set of dish antennas corresponding with the first set of enhanced STB signal systems. In one example, a target location associated with a dish antenna that has captured RF signals that are unable to be decoded may be identified and the first set of enhanced STB signal systems may correspond with one or more dish antenna locations that are more than a threshold distance away from the target location (e.g., that are more than five miles away from the target location). The first set of enhanced STB signal systems may be identified based on a path of enhanced STB signal systems that extend more than the threshold distance away from the target location and also include at least one enhanced STB signal system within an auxiliary transmission range of the target location (e.g., less than one mile from the target location). In reference to FIG. 3, the target location may correspond with a location of the dish antenna 311 and the first set of enhanced STB signal systems may correspond with enhanced STB signal systems 342-345; in this case, the dish antenna 302 more be located more than five miles away from the target location and the dish antenna 305 may be less than one mile away from the dish antenna 310.

Figure 4A:
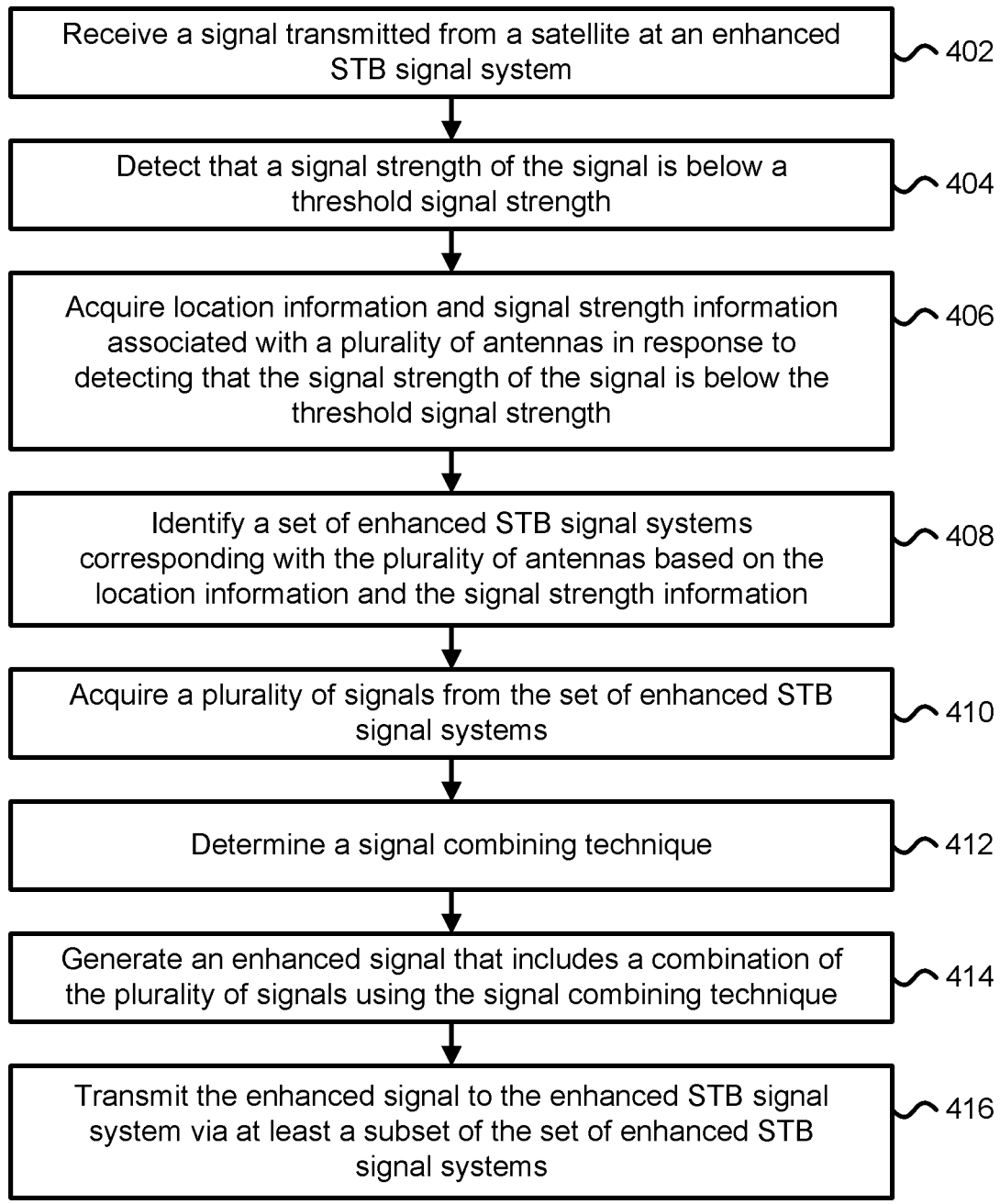
FIG. 4A depicts a flowchart describing one embodiment of a process for enhancing set-top box signal reception during adverse weather conditions.

FIG. 4A depicts a flowchart describing one embodiment of a process for enhancing set-top box signal reception during adverse weather conditions. In one embodiment, the process of FIG. 4A may be performed by an enhanced STB signal system, such as the enhanced STB signal system 142 in FIG. 1A. The process of FIG. 4A may be performed using processing elements within an enhanced STB signal system or within a set-top box. In some embodiments, the process or portions of the process of FIG. 4A may be performed using one or more virtual machines and one or more virtual storage devices.

In step 402, a signal transmitted from a satellite is received at an enhanced STB signal system. The signal may derive from RF signals captured using a dish antenna that have been filtered, amplified, and/or down-converted (e.g., using a low-noise block down-converter mounted to the dish antenna). The enhanced STB signal system may correspond with the enhanced STB signal system 142 in FIG. 1A. In step 404, it is detected that a signal strength of the signal is below a threshold signal strength. In step 406, location information and signal strength information associated with a plurality of antennas is acquired in response to detecting that the signal strength of the signal is below the threshold signal strength. The location information may comprise GPS location information for the plurality of antennas, wherein each antenna of the plurality of antennas has a signal strength above a threshold signal strength and/or a signal-to-noise ratio (SNR) above a threshold SNR (e.g., is greater than 10 dB). The plurality of antennas may comprise antennas with the ability to capture unobstructed RF signals from the satellite.

In step 408, a set of enhanced STB signal systems corresponding with the plurality of antennas is identified based on the location information and the signal strength information. In one example, the set of enhanced STB signal systems may correspond with the set of enhanced STB signal systems 342-345 in FIG. 3, wherein each enhanced STB signal system of the set of enhanced STB signal systems is able to capture RF signals with at least a minimum SNR and/or capture RF signals that include content that may be decoded. In step 410, a plurality of signals is acquired from the set of enhanced STB signal systems. In step 412, a signal combining technique is determined. In one embodiment, the signal combining technique may comprise equal-gain combining if the signal strength of signals derived from the plurality of antennas is at least a threshold signal strength; otherwise, the signal combining technique may comprise maximal-ratio combining.

In step 414, an enhanced signal that includes a combination of the plurality of signals is generated using the signal combining technique determined in step 412. In one example, the enhanced signal may correspond with the output signal 326 in FIG. 3. In another example, the enhanced signal may correspond with the output signal 283 in FIG. 2D. In step 416, the enhanced signal is transmitted to the enhanced STB signal system via at least a subset of the set of enhanced STB signal systems identified in step 408.

Figure 4B:
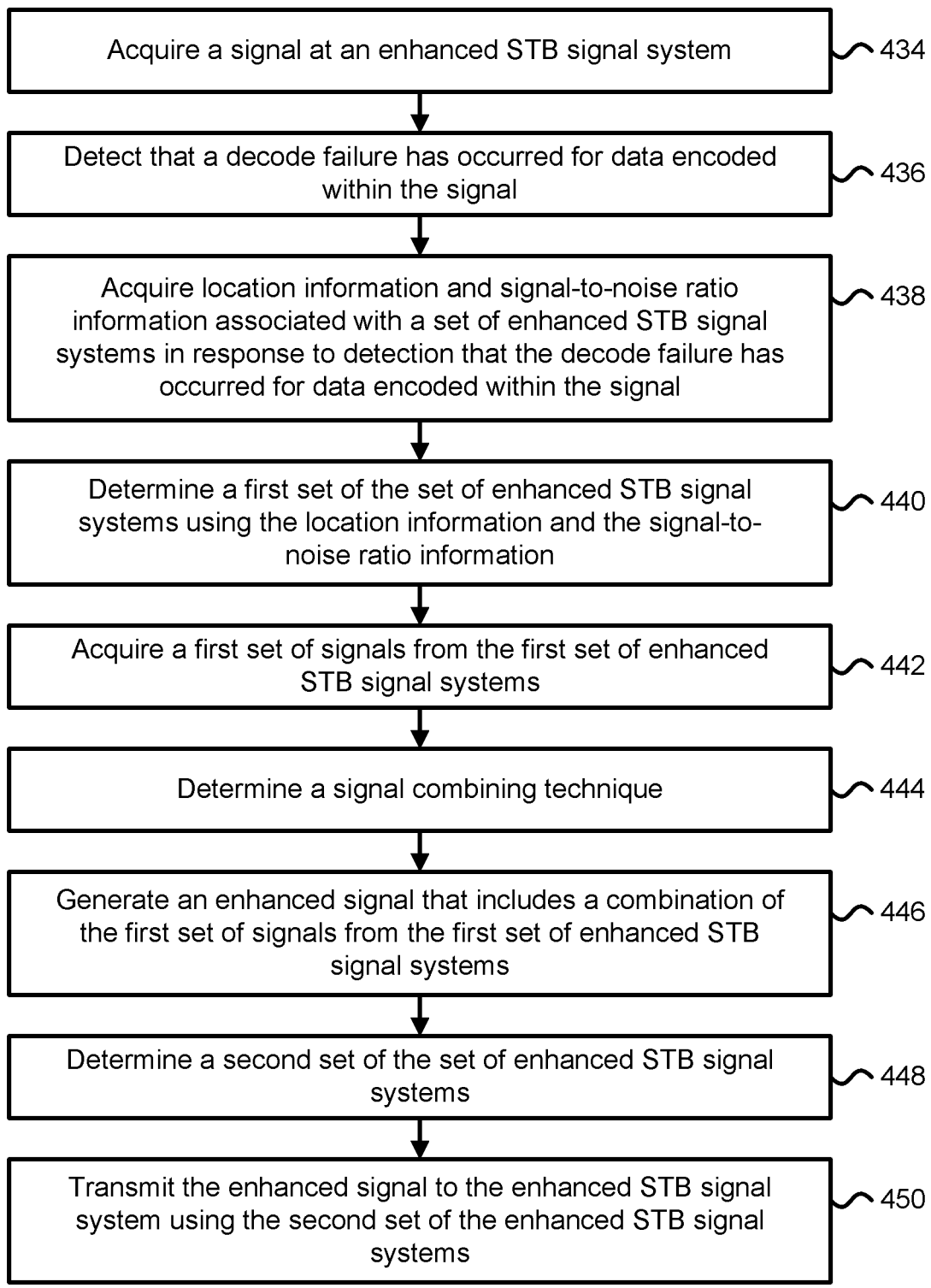
FIG. 4B depicts a flowchart describing another embodiment of a process for enhancing set-top box signal reception during adverse weather conditions.

FIG. 4B depicts a flowchart describing another embodiment of a process for enhancing set-top box signal reception during adverse weather conditions. In one embodiment, the process of FIG. 4B may be performed by an enhanced STB signal system, such as the enhanced STB signal system 142 in FIG. 1A. The process of FIG. 4B may be performed using processing elements within an enhanced STB signal system or within a set-top box. In some embodiments, the process or portions of the process of FIG. 4B may be performed using one or more virtual machines and one or more virtual storage devices.

In step 434, a signal is acquired at an enhanced STB signal system. In some cases, the signal may derive from RF signals captured using a dish antenna that were filtered, amplified, and/or down-converted (e.g., using a low-noise block down-converter mounted to the dish antenna). The enhanced STB signal system may correspond with the enhanced STB signal system 347 in FIG. 3. In step 436, it is detected that a decode failure has occurred for data or content encoded within the signal. In one example, a decode failure may be detected by the enhanced STB signal system or a set-top box that is unable to decode content from the signal. In step 438, location information and/or signal-to-noise ratio information associated with a set of enhanced STB signal systems is acquired. The location information associated with the set of enhanced STB signal systems may be acquired in response to detection that the decode failure has occurred for the data (or for content) encoded within the signal and/or in response to detection that the SNR of the signal is below a threshold SNR.

In step 440, a first set of the set of enhanced STB signal systems is determined. The first set of enhanced STB signal systems may be determined using the location information and/or the signal-to-noise ratio information. In at least one example, each enhanced STB signal system of the first set of the set of enhanced STB signal systems may be located at least five miles away from a dish antenna from which the signal in step 434 was acquired or derived. In another example, a furthest enhanced STB signal system of the first set of the set of enhanced STB signal systems may be located at least five miles away from a dish antenna associated with the enhanced STB signal system and a nearest enhanced STB signal system of the first set of the set of enhanced STB signal systems may be located within one mile of the dish antenna associated with the enhanced STB signal system.

In some cases, a target location (e.g., specified as a GPS location) associated with a dish antenna that captured RF signals from which the signal in step 434 was derived may be determined and each enhanced STB signal system of the first set of the set of enhanced STB signal systems may be located at least five miles away from the target location. In other cases, a target location (e.g., specified as a GPS location) associated with a dish antenna that captured RF signals from which the signal in step 434 was derived may be determined and at least one of the first set of the set of enhanced STB signal systems is located at least five miles away from the target location (e.g., at a distance that is outside of a localized weather event, such as a thunderstorm) and at least one of the first set of the set of enhanced STB signal systems is located within one mile of the target location (e.g., at a distance that allows for a series of auxiliary transmitters and receivers to combine signal information from receiving antennas outside of the localized weather event and deliver the combined signal information to the enhanced STB signal system at the target location).

In step 442, a first set of signals is acquired from the first set of enhanced STB signal systems. The first set of signals may derive from RF signals captured by dish antennas connected to the first set of enhanced STB signal systems. In step 444, a signal combining technique is determined. The signal combining technique may comprise equal-gain combining if a signal strength of each of the first set of signals is at least a threshold signal strength; otherwise, the signal combining technique may comprise maximal-ratio combining. In step 446, an enhanced signal that includes a combination of the first set of signals from the first set of enhanced STB signal systems is generated. In step 448, a second set of the set of enhanced STB signal systems is determined. The second set of the set of enhanced STB signal systems may comprise a sequence of enhanced STB signal systems for delivering the enhanced signal to the enhanced STB signal system that is unable to provide decoded content to a set-top box.

In step 450, the enhanced signal is transmitted to the enhanced STB signal system using the second set of enhanced STB signal systems. In reference to FIG. 3, the first set of enhanced STB signal systems may correspond with the enhanced STB signal systems 342-345 and the second set of enhanced STB signal systems may correspond with the enhanced STB signal system 346. The first set of enhanced STB signal systems may be in communication with dish antennas that captured unobstructed RF signals or captured RF signals with at least a threshold SNR. The second set of enhanced STB signal systems may be used to buffer and/or transmit the enhanced signal generated by the first set of enhanced STB signal systems to the enhanced STB signal system that provided the signal that generated the decoding failure.

At least one embodiment of the disclosed technology includes acquiring, at an enhanced set-top box signal system, a signal that derives from one or more RF signals captured using a receiving antenna, detecting that a decoding failure has occurred for data encoded within the signal, determining a first set of enhanced set-top box signal systems, acquiring a first set of signals from the first set of enhanced set-top box signal systems, generating an enhanced signal that includes a combination of the first set of signals, and transmitting the enhanced signal to the enhanced set-top box signal system.

At least one embodiment of the disclosed technology comprises an electronic device including a storage device (e.g., a semiconductor memory) and one or more processors in communication with the storage device. The storage device configured to store a signal that derives from one or more RF signals captured using a receiving antenna. The one or more processors configured to detect that a signal strength of the signal is less than a threshold signal strength, determine a first set of enhanced set-top box signal systems in response to detection that the signal strength of the signal is less than the threshold signal strength, acquire a first set of signals from the first set of enhanced set-top box signal systems, generate an enhanced signal that includes a combination of the first set of signals, and cause the enhanced signal to be transmitted to the enhanced set-top box signal system.

At least one embodiment of the disclosed technology includes acquiring, at an enhanced set-top box signal system, a signal that derives from one or more RF signals captured using a dish antenna, detecting that a decoding failure has occurred for content encoded within the signal, acquiring location information for a first set of enhanced set-top box signal systems, determining the first set of enhanced set-top box signal systems based on the location information, acquiring a first set of signals from the first set of enhanced set-top box signal systems, generating an enhanced signal that includes a combination of the first set of signals, and transmitting the enhanced signal to the enhanced set-top box signal system.

In some cases, the method may further comprise that the first set of enhanced set-top box signal systems includes a second enhanced set-top box signal system that is more than a first threshold distance away from the dish antenna and that the first set of enhanced set-top box signal systems includes a third enhanced set-top box signal system that is less than a second threshold distance away from the dish antenna, wherein the first threshold distance is greater than the second threshold distance.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each block in a flowchart may correspond with a program module or portion of computer program code, which may comprise one or more computer-executable instructions for implementing the specified functionality. In some implementations, the functionality noted within a block may occur out of the order noted in the figures. For example, two blocks shown in succession may, in fact, be executed substantially concurrently, or the blocks may sometimes be executed in the reverse order, depending upon the functionality involved. In some implementations, the functionality noted within a block may be implemented using hardware, software, or a combination of hardware and software.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first content-receiver system, comprising:
a first antenna configured to capture a first signal;
a memory configured to store computer instructions; and
one or more processors configured to execute the computer instructions to:
obtain the first signal from the first antenna;
identify a second content-receiver system associated with a second antenna, the second content-receiver system being separate from the first content-receiver system;
acquire a second signal from the second content-receiver system;
generate an enhanced signal from a combination of the first signal and the second signal; and
in response to a third signal captured using a third antenna associated with a third content-receiver system being degraded, provide the enhanced signal to the third content-receiver system.

2. The system of claim 1, wherein the one or more processors provide the enhanced signal to the third content-receiver system in response to the third signal being below a threshold signal strength.

3. The system of claim 1, wherein the one or more processors provide the enhanced signal to the third content-receiver system in response to a decoding failure of the third signal.

4. The system of claim 1, wherein the one or more processors identify the second content-receiver system by being configured to further execute the computer instructions to:
determine a location of the second antenna associated with the second content-receiver system; and
identify the second set-top box signal system based on the location of the second antenna.

5. The system of claim 1, wherein the one or more processors identify the second content-receiver system by being configured to further execute the computer instructions to:
select the second set-top box signal system based on the second antenna associated with the second content-receiver system being located at least a threshold distance from the third antenna associated with the third content-receiver system.

6. The system of claim 1, wherein the one or more processors identify the second content-receiver system by being configured to further execute the computer instructions to:
- select the second set-top box signal system based on the second antenna associated with the second content-receiver system being located less than a threshold distance from the third antenna associated with the third content-receiver system.

7. The system of claim 1, wherein the one or more processors identify the second content-receiver system by being configured to further execute the computer instructions to:
- determine a first location of the third antenna associated with the third content-receiver system;
- determine a second location of the second antenna associated with the second content-receiver system; and
- select the second content-receiver system in response to the determined second location exceeding a threshold distance from the determined first location of the third antenna.

8. The system of claim 1, wherein the one or more processors identify the second content-receiver system by being configured to further execute the computer instructions to:
- determine a first location of the third antenna associated with the third content-receiver system;
- determine a second location of the second antenna associated with the second content-receiver system; and
- select the second content-receiver system in response to the determined second location being less than a threshold distance from the determined first location of the third antenna.

9. The system of claim 1, wherein the second signal is captured using the second antenna associated with the second content-receiver system.

10. The system of claim 1, wherein the second signal is a combination of a signal captured using the second antenna associated with the second content-receiver system and a fourth signal captured using a fourth antenna associated with a fourth content-receiver system.

11. A method, comprising:
- obtaining, by a first content-receiver system, a first signal from a first antenna associated with the first content-receiver system;
- determining, by the first content-receiver system, a second content-receiver system associated with a second antenna, the second content-receiver system being separate from the first content-receiver system;
- obtaining, by the first content-receiver system, a second signal from the second content-receiver system;
- generating, by the first content-receiver system, an enhanced signal from a combination of the first signal and the second signal; and
- in response to a third signal captured using a third antenna associated with a third content-receiver system being degraded, providing, by the first content-receiver system, the enhanced signal to the third content-receiver system.

12. The method of claim 11, wherein providing the enhanced signal to the third content-receiver system comprises:
- providing, by the first content-receiver system, the enhanced signal to the third content-receiver system in response to the third signal being below a threshold signal strength.

13. The method of claim 11, wherein providing the enhanced signal to the third content-receiver system comprises:
- providing, by the first content-receiver system, the enhanced signal to the third content-receiver system in response to a decoding failure of the third signal.

14. The method of claim 11, wherein determining the second content-receiver system comprises:
- selecting, by the first content-receiver system, the second set-top box signal system based on the second antenna associated with the second content-receiver system being located at least a threshold distance from the third antenna associated with the third content-receiver system.

15. The method of claim 11, wherein determining the second content-receiver system comprises:
- selecting, by the first content-receiver system, the second set-top box signal system based on the second antenna associated with the second content-receiver system being located less than a threshold distance from the third antenna associated with the third content-receiver system.

16. The method of claim 11, wherein the second signal is captured using the second antenna associated with the second content-receiver system.

17. The method of claim 11, wherein the second signal is a combination of a signal captured using the second antenna associated with the second content-receiver system and a fourth signal captured using a fourth antenna associated with a fourth content-receiver system.

18. A non-transitory computer-readable storage medium that stores instructions that, when executed by a processor in a first content-receiver system, cause the processor to perform actions, the actions comprising:
- receiving a first signal captured using a first antenna associated with the first content-receiver system;
- selecting a second content-receiver system associated with a second antenna, the second content-receiver system being separate from the first content-receiver system;
- receiving a second signal from the second content-receiver system;
- generating an enhanced signal from a combination of the first signal and the second signal; and
- providing the enhanced signal to a third content-receiver system in response to a third signal captured using a third antenna associated with the third content-receiver system being degraded.

19. The non-transitory computer-readable storage medium of claim 18, wherein the processor provides the enhanced signal to the third content-receiver system in response to the third signal being below a threshold signal strength.

20. The non-transitory computer-readable storage medium of claim 18, wherein the processor provides the enhanced signal to the third content-receiver system in response to a decoding failure of the third signal.

* * * * *